(12) United States Patent
Li et al.

(10) Patent No.: US 12,516,175 B2
(45) Date of Patent: Jan. 6, 2026

(54) INSULATING MATERIAL, AND PREPARATION METHOD AND USE THEREOF

(71) Applicant: Tianjin University, Tianjin (CN)

(72) Inventors: Zhonglei Li, Tianjin (CN); Heyu Wang, Tianjin (CN); Boxue Du, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 18/753,801

(22) Filed: Jun. 25, 2024

(65) Prior Publication Data
US 2025/0282927 A1    Sep. 11, 2025

(30) Foreign Application Priority Data
Mar. 8, 2024 (CN) .......................... 202410268957.8

(51) Int. Cl.
| | | |
|---|---|---|
| *C08K 3/30* | (2006.01) | |
| *C08J 3/20* | (2006.01) | |
| *C08K 5/105* | (2006.01) | |
| *C08K 5/14* | (2006.01) | |
| *C08K 9/04* | (2006.01) | |
| *H01B 3/44* | (2006.01) | |

(52) U.S. Cl.
CPC ................ *C08K 3/30* (2013.01); *C08J 3/203* (2013.01); *C08K 5/105* (2013.01); *C08K 5/14* (2013.01); *C08K 9/04* (2013.01); *H01B 3/441* (2013.01); *C08J 2323/06* (2013.01); *C08K 2003/3036* (2013.01); *C08K 2201/005* (2013.01)

(58) Field of Classification Search
None
See application file for complete search history.

(56) References Cited

U.S. PATENT DOCUMENTS

| | | | | |
|---|---|---|---|---|
| 2009/0264567 A1* | 10/2009 | Prins | ...................... | C08K 5/005 |
| | | | | 524/331 |
| 2013/0075692 A1* | 3/2013 | Naasani | ............... | C09K 11/883 |
| | | | | 257/E33.059 |
| 2015/0075397 A1* | 3/2015 | Gresty | .................. | C09D 11/12 |
| | | | | 524/548 |

FOREIGN PATENT DOCUMENTS

| | | |
|---|---|---|
| CN | 104448493 A | 3/2015 |
| CN | 115850878 A | 3/2023 |
| CN | 118165392 B | 12/2024 |

OTHER PUBLICATIONS

First Office Action dated Jul. 25, 2024 issued in Chinese Patent Application No. 202410268957.8 with Translation. (8 pages).
Second Office Action dated Sep. 20, 2024 issued in Chinese Patent Application No. 202410268957.8 with Translation. (12 pages).
Zhipeng Lei et al.; "Space Charge Behavior of Quantum Dot-Doped Polystyrene Polymers"; IEEE Transactions on Dielectrics and Electrical Insulation; vol. 28, No. 3; Jun. 2021. (9 pages).
Notification to Grant Patent Right for Invention dated Nov. 22, 2024 issued in Chinese Patent Application No. 202410268957.8 with Translation. (3 pages).

* cited by examiner

*Primary Examiner* — Robert S Jones, Jr.
*Assistant Examiner* — Christiaan Roelofse
(74) *Attorney, Agent, or Firm* — Rothwell, Figg, Ernst & Manbeck, P.C.

(57) ABSTRACT

Provided are an insulating material, and a preparation method and use thereof. The insulation material includes the following components in parts by mass: 100 parts of polyethylene, 0.01 parts to 1 part of a core-shell quantum dot, 0.5 parts to 2 parts of a peroxide cross-linking agent, and 0.5 parts to 2 parts of an antioxidant.

14 Claims, 3 Drawing Sheets

INSULATING MATERIAL, AND PREPARATION METHOD AND USE THEREOF

CROSS REFERENCE TO RELATED APPLICATION

This patent application claims the benefit and priority of Chinese Patent Application No. 2024102689578 filed with the China National Intellectual Property Administration on Mar. 8, 2024, the disclosure of which is incorporated by reference herein in its entirety as part of the present application.

TECHNICAL FIELD

The present disclosure belongs to the technical field of insulating materials, and specifically relates to an insulating material, and a preparation method and use thereof.

BACKGROUND

High-voltage direct current (HVDC) transmission is an important means for offshore new-energy grid integration, large-capacity and long-distance transmission, and cross-regional power grid interconnection. As a key equipment in HVDC transmission projects, HVDC cables determine the reliability and stability of a transmission system. The insulation performance of HVDC cable directly affects the efficiency and safety of electrical energy transmission.

Polyethylene exhibits desirable electrical resistance, and is subjected to cross-linking reaction to form cross-linked polyethylene, which can further improve heat resistance and mechanical properties. Therefore, polyethylene has become a main material for extruded insulation of HVDC cable nowadays. However, the electric field distribution in an insulation layer of the HVDC cable is determined by a conductivity of materials. Normally, the conductivity increases exponentially as the temperature increases, causing electric field reversal during normal operation of the HVDC cable. Moreover, space charge accumulation may occur when the insulation layer is under HVDC stress for a long time, and can further distort an internal electric field of the insulation layer, leading to insulation failure. Accordingly, it is an urgent technical problem to be solved to provide a polyethylene cable insulation material with lower electrical conductivity under high temperature and strong electric fields.

SUMMARY

In view of this, the present disclosure provides an insulating material, and a preparation method and use thereof. In the present disclosure, the insulating material exhibits a low electrical conductivity under high temperature and strong electric fields, and can maintain a desirable insulation performance under high temperature and strong electric fields.

To solve the above technical problems, the present disclosure provides an insulating material, including the following components in parts by mass:
  100 parts of polyethylene;
  0.01 parts to 1 part of a core-shell quantum dot;
  0.5 parts to 2 parts of a peroxide cross-linking agent; and
  0.5 parts to 2 parts of an antioxidant.

In some embodiments, the core-shell quantum dot includes a core layer, a shell layer covering a surface of the core layer, and an oil-soluble modified ligand on a surface of the shell layer;
  the core layer and the shell layer are independently groups II-VI semiconductor materials; and
  the core-shell quantum dot has an average particle size of 2 nm to 20 nm.

In some embodiments, the core layer is selected from the group consisting of cadmium selenide and zinc selenide;
  the shell layer is zinc sulfide; and
  the oil-soluble modified ligand is octadecylamine.

In some embodiments, the peroxide cross-linking agent comprises one selected from the group consisting of dicumyl peroxide (DCP) and bis(tert-butyldioxyisopropyl)benzene (BIPB); and the antioxidant comprises one selected from the group consisting of octadecyl 3-(3,5-di-tert-butyl-4-hydroxyphenyl)propionate (antioxidant 1076, CAS: 2082-79-3), pentaerythritol tetrakis(3-(3,5-di-tert-butyl-4-hydroxyphenyl)propionate) (antioxidant 1010, CAS: 6683-19-8), and 4,4'-thiobis(6-tert-butyl-m-cresol) (antioxidant 300, CAS: 96-69-5).

In some embodiments, the polyethylene is low-density polyethylene.

The present disclosure further provides a method for preparing the insulating material as described above, including the following steps:
  dissolving the polyethylene in a first organic solvent to obtain a polyethylene solution;
  dispersing the core-shell quantum dot in a second organic solvent to obtain a core-shell quantum dot dispersion;
  mixing the polyethylene solution with the core-shell quantum dot dispersion, and subjecting a resulting mixture to distillation to obtain a core-shell quantum dot/polyethylene composite material; and
  mixing the core-shell quantum dot/polyethylene composite material, the peroxide cross-linking agent, and the antioxidant, and subjecting a resulting mixture to leveling absorption to obtain the insulating material.

In some embodiments, the distillation is vacuum distillation; and
  the vacuum distillation is conducted at a vacuum degree of 0.08 atm to 0.12 atm and a temperature of 65° C. to 75° C.

In some embodiments, the method further includes: after the distillation, subjecting a solid obtained after the distillation to ethanol washing and vacuum drying in sequence.

In some embodiments, the leveling absorption is conducted at a temperature of 68° C. to 72° C. for 22 h to 26 h.

The present disclosure further provides use of the insulating material as described above or the insulating material prepared by the method as described above as an insulating material for a HVDC transmission cable.

The present disclosure provides an insulating material, including the following components in parts by mass: 100 parts of polyethylene, 0.01 parts to 1 part of a core-shell quantum dot, 0.5 parts to 2 parts of a peroxide cross-linking agent, and 0.5 parts to 2 parts of an antioxidant. In the present disclosure, a contact interface formed between a core layer and a shell layer of the core-shell quantum dot belongs to n-n type semiconductor heterostructure contact, and an energy band structure of the core layer bends downward while an energy band structure of the shell layer bends upward. Electron carriers at the bottom of a conduction band may be limited by a core-shell interface and can have difficulty in continuing to migrate. Hole carriers at the top of a valence band migrate to the shell layer due to the influence of a built-in contact potential. A core-shell interface of the core-shell quantum dot itself provides a confinement effect on electron carriers, while an interface between the shell layer and an insulating matrix provides a confinement effect on hole carriers. Moreover, the confinement effect gradually increases as a band gap difference between the core layer and the shell layer of the quantum dot increases, thereby limiting carriers migration at high temperature and strong electric fields, inhibiting space charge accumulation, and then improving an insulation performance of the insulating material under high temperature and strong electric fields.

DETAILED DESCRIPTION

Figure 1:
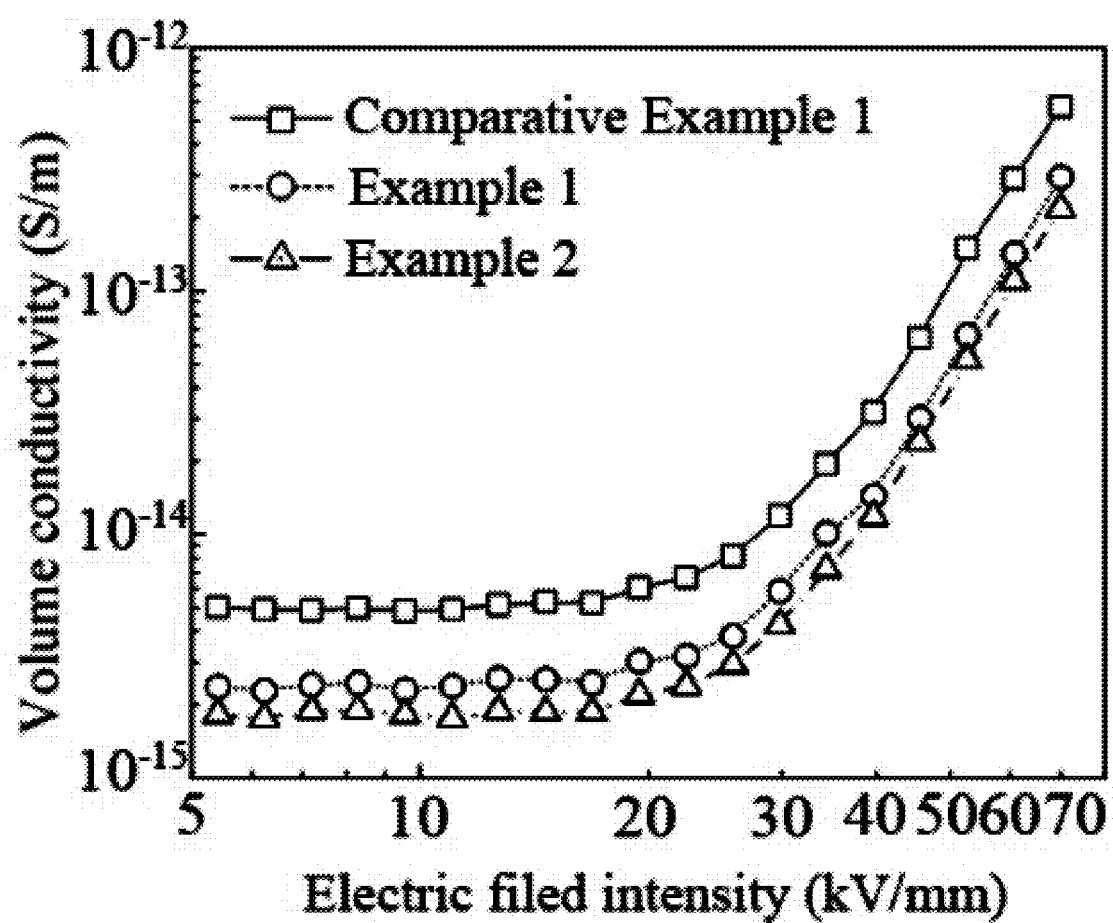
FIG. 1 shows a point-line diagram of volume conductivity of the insulating materials prepared in Example 1, Example 2, and Comparative Example 1 as a function of electric field intensity at 30° C.

The present disclosure provides an insulating material, including the following components in parts by mass:
100 parts of polyethylene;
0.01 parts to 1 part of a core-shell quantum dot;
0.5 parts to 2 parts of a peroxide cross-linking agent; and
0.5 parts to 2 parts of an antioxidant.

In the present disclosure, the insulating material includes 100 parts by mass of polyethylene. In some embodiments of the present disclosure, the polyethylene is low-density polyethylene. In some embodiments of the present disclosure, the low-density polyethylene has a number-average molecular weight of $2 \times 10^4$ to $2 \times 10^5$, and the low-density polyethylene has a weight-average molecular weight of $5 \times 10^4$ to $5 \times 10^5$. The low-density polyethylene has excellent electrical properties, desirable mechanical properties, and high toughness, and is suitable for producing and manufacturing of high-voltage cables. In the present disclosure, the polyethylene serves as an insulating matrix.

In the present disclosure, in terms of the parts by mass of the polyethylene, the insulating material includes 0.01 parts to 1 part of a core-shell quantum dot, and preferably 0.04 parts to 0.06 parts. In some embodiments of the present disclosure, the core-shell quantum dot includes a core layer, a shell layer covering a surface of the core layer, and an oil-soluble modified ligand on a surface of the shell layer. In some embodiments of the present disclosure, the core layer is groups II-VI semiconductor materials, and preferably cadmium selenide (CdSe) or zinc selenide (ZnSe). In some embodiments of the present disclosure, the shell layer is groups II-VI semiconductor materials, and preferably zinc sulfide (ZnS). In some embodiments of the present disclosure, the oil-soluble modified ligand is octadecylamine. In some embodiments of the present disclosure, the core-shell quantum dot has an average particle size of 2 nm to 20 nm, and preferably 5 nm to 15 nm. The core-shell quantum dot is evenly dispersed in a polyethylene insulating matrix.

In the present disclosure, in terms of the parts by mass of the polyethylene, the insulating material includes 0.5 parts to 2.0 parts of a peroxide cross-linking agent, and preferably 1.0 part to 2.0 parts. In some embodiments of the present disclosure, the peroxide cross-linking agent includes dicumyl peroxide or bis(tert-butyldioxyisopropyl)benzene, and preferably the dicumyl peroxide.

In the present disclosure, in terms of the parts by mass of the polyethylene, the insulating material includes 0.5 parts to 2.0 parts of an antioxidant, and preferably 1.0 part to 1.5 parts. In some embodiments of the present disclosure, the antioxidant includes antioxidant 1076, antioxidant 1010, or antioxidant 300, and preferably the antioxidant 1076.

In the present disclosure, the energy band shift of a heterogeneous interface of the core-shell nano-quantum dot in the insulating material causes mutations at the bottom of a conduction band and the top of a valence band, which have a confinement effect on electrons and holes, respectively, thereby limiting migration of carriers under high temperature and strong electric fields and inhibiting the accumulation of space charges.

The present disclosure further provides a method for preparing the insulating material as described above, including the following steps:
dissolving the polyethylene in a first organic solvent to obtain a polyethylene solution;
dispersing the core-shell quantum dot in a second organic solvent to obtain a core-shell quantum dot dispersion;
mixing the polyethylene solution with the core-shell quantum dot dispersion, and subjecting a resulting mixture to distillation to obtain a core-shell quantum dot/polyethylene composite material; and
mixing the core-shell quantum dot/polyethylene composite material, the peroxide cross-linking agent, and the antioxidant, and subjecting a resulting mixture to leveling absorption to obtain the insulating material.

In the present disclosure, the polyethylene is dissolved in a first organic solvent to obtain a polyethylene solution. In some embodiments of the present disclosure, the first organic solvent is xylene. In some embodiments of the present disclosure, a mass ratio of the polyethylene to the first organic solvent is in a range of 1: (9-10), and preferably 1:10. There are no special requirements for the dissolving, as long as the polyethylene can be fully dissolved. In some embodiments of the present disclosure, the dissolving is conducted at 80° C.

In the present disclosure, the core-shell quantum dot is dispersed in a second organic solvent to obtain a core-shell quantum dot dispersion. In some embodiments of the present disclosure, the second organic solvent is toluene, xylene, or cyclohexane, and preferably the cyclohexane. In some embodiments of the present disclosure, a ratio of a mass of the core-shell quantum dot to a volume of the second organic solvent is in a range of 1 mg: (0.8-1.2) mL, and preferably 1 mg: 1 mL. In some embodiments of the present disclosure, the dispersing is conducted by ultrasonic treatment. In some embodiments of the present disclosure, the ultrasonic treatment is conducted at a power of 30 W to 200 W, and preferably 60 W to 100 W; and the ultrasonic treatment is conducted for 8 min to 12 min, and preferably 10 min. In some embodiments of the present disclosure, the dispersing is conducted at a temperature of 75° C. to 85° C., and preferably 80° C. In some embodiments of the present disclosure, the temperature for the dispersing is provided by water bath.

In the present disclosure, after the polyethylene solution and the core-shell quantum dot dispersion are obtained, the polyethylene solution is mixed with the core-shell quantum dot dispersion, and a resulting mixture is subjected to distillation to obtain a core-shell quantum dot/polyethylene composite material. In some embodiments of the present disclosure, the distillation is vacuum distillation. In some embodiments of the present disclosure, the vacuum distillation is conducted under a vacuum degree of 0.08 atm to 0.12 atm, and preferably 0.1 atm; and the vacuum distillation is conducted at a temperature of 65° C. to 75° C., and preferably 70° C. In some embodiments of the present disclosure, the distillation is conducted in a rotary evaporator.

In the present disclosure, the method further includes: after the distillation, subjecting a solid obtained after the distillation to ethanol washing and vacuum drying in sequence. In some embodiments of the present disclosure, the solid obtained after the distillation is in the form of a powder. In some embodiments of the present disclosure, ethanol used in ethanol washing is absolute ethanol. In some embodiments of the present disclosure, the vacuum drying is conducted under a vacuum degree of 0.08 atm to 0.12 atm, and preferably 0.1 atm; the vacuum drying is conducted at a temperature of 65° C. to 75° C., and preferably 70° C.; and the vacuum drying is conducted for 10 h to 14 h, and preferably 12 h. The ethanol washing and the vacuum drying can remove an organic solvent remaining on a surface of the core-shell quantum dot/polyethylene composite material.

In the present disclosure, after the core-shell quantum dot/polyethylene composite material is obtained, the core-shell quantum dot/polyethylene composite material, the peroxide cross-linking agent, and the antioxidant are mixed, and a resulting mixture is subjected to leveling absorption to obtain the insulating material. There are no special requirements for the mixing, as long as the above three materials can be mixed to be uniform. In some embodiments of the present disclosure, the leveling absorption is conducted at a temperature of 68° C. to 72° C., and preferably 70° C.; and the leveling absorption is conducted for 22 h to 26 h, and preferably 24 h. A "post-absorption" process is conducted to penetrate the peroxide cross-linking agent and the antioxidant into the polyethylene insulating matrix in the form of liquid diffusion; and the leveling absorption can effectively prevent melt blending from subjecting the peroxide cross-linking agent to high temperature, which may lead to premature cross-linking reactions.

The present disclosure further provides use of the insulating material as described above or the insulating material prepared by the method as described above as an insulating material for HVDC transmission cable.

To further illustrate the present disclosure, the technical solutions provided by the present disclosure are described in detail below with reference to examples, but these examples should not be construed as limiting the scope of the present disclosure.

Example 1

Cadmium selenide@zinc sulfide (CdSe@ZnS) was used as a core-shell quantum dot.

5 g of low-density polyethylene pellets were dissolved in 50 g of xylene at 80° C. to obtain a low-density polyethylene solution;

2 mg of the CdSe@ZnS was dispersed (by ultrasonic treatment at 80° C. and 60 W for 10 min) in 2 mL of cyclohexane to obtain a quantum dot dispersion.

The low-density polyethylene solution and the quantum dot dispersion were stirred at 80° C. for 15 min and transferred into a rotary evaporator, and a resulting mixture was subjected to vacuum distillation at 70° C. and 0.1 atm to obtain a precipitated product. The precipitated product was rinsed with absolute ethanol and then subjected to vacuum drying at 70° C. and 0.1 atm for 12 h to obtain a core-shell quantum dot/polyethylene composite material.

The core-shell quantum dot/polyethylene composite material, 0.1 g of dicumyl peroxide (as a cross-linking agent), and 0.05 g of antioxidant 1076 were mixed, and a resulting mixture was subjected to leveling absorption at 70° C. for 24 h to obtain an insulating material.

Example 2

Zinc selenide@zinc sulfide (ZnSe@ZnS) was used as a core-shell quantum dot.

5 g of low-density polyethylene pellets were dissolved in 50 g of xylene at 80° C. to obtain a low-density polyethylene solution;

2 mg of the ZnSe@ZnS was dispersed (by ultrasonic treatment at 80° C. and 60 W for 10 min) in 2 mL of toluene to obtain a quantum dot dispersion.

The low-density polyethylene solution and the quantum dot dispersion were stirred at 80° C. for 15 min and transferred into a rotary evaporator, and a resulting mixture was subjected to vacuum distillation at 70° C. and 0.1 atm to obtain a precipitated product. The precipitated product was rinsed with absolute ethanol and then subjected to vacuum drying at 70° C. and 0.1 atm for 12 h to obtain a core-shell quantum dot/polyethylene composite material.

The core-shell quantum dot/polyethylene composite material, 0.1 g of dicumyl peroxide (as a cross-linking agent), and 0.05 g of antioxidant 1076 were mixed, and a resulting mixture was subjected to leveling absorption at 70° C. for 24 h to obtain an insulating material.

Comparative Example 1

An insulating material was prepared according to the method in Example 2, except that no quantum dot was added; and the preparation method included the following steps:

5 g of low-density polyethylene pellets were dissolved in 50 g of xylene at 80° C. to obtain a low-density polyethylene solution.

The low-density polyethylene solution was stirred at 80° C. for 15 min and transferred into a rotary evaporator, and the low-density polyethylene solution was subjected to vacuum distillation at 70° C. and 0.1 atm to obtain a precipitated product. The precipitated product was rinsed with absolute ethanol and then subjected to vacuum drying at 70° C. and 0.1 atm for 12 h to obtain a product. The product was mixed with 0.1 g of dicumyl peroxide (as a cross-linking agent) and 0.05 g of antioxidant 1076, and a resulting mixture was subjected to leveling absorption at 70° C. for 24 h to obtain the insulating material.

Changes in volume conductivity of the insulating materials prepared in Example 1, Example 2, and Comparative Example 1 with the electric field intensity at 30° C. and 90° C. were tested using a three-electrode experimental system, and the test results are listed in Table 1.

TABLE 1

Volume conductivity of Example 1, Example 2, and Comparative Example 1 under different electric field intensities

| Electric field intensity (kV·mm$^{-1}$) | Temperature (°C.) | Volume conductivity (S·m$^{-1}$) | | |
|---|---|---|---|---|
| | | Comparative Example 1 | Example 1 | Example 2 |
| 5.41 | 30 | $5.01 \times 10^{-15}$ | $2.37 \times 10^{-15}$ | $2.28 \times 10^{-15}$ |
| | 90 | $6.59 \times 10^{-13}$ | $4.03 \times 10^{-13}$ | $3.22 \times 10^{-13}$ |
| 6.24 | 30 | $4.91 \times 10^{-15}$ | $2.28 \times 10^{-15}$ | $2.20 \times 10^{-15}$ |
| | 90 | $6.67 \times 10^{-13}$ | $3.77 \times 10^{-13}$ | $3.21 \times 10^{-13}$ |
| 7.19 | 30 | $4.90 \times 10^{-15}$ | $2.43 \times 10^{-15}$ | $2.36 \times 10^{-15}$ |
| | 90 | $6.66 \times 10^{-13}$ | $3.92 \times 10^{-13}$ | $3.40 \times 10^{-13}$ |
| 8.29 | 30 | $4.99 \times 10^{-15}$ | $2.45 \times 10^{-15}$ | $2.38 \times 10^{-15}$ |
| | 90 | $6.60 \times 10^{-13}$ | $3.91 \times 10^{-13}$ | $3.66 \times 10^{-13}$ |
| 9.56 | 30 | $4.85 \times 10^{-15}$ | $2.30 \times 10^{-15}$ | $2.28 \times 10^{-15}$ |
| | 90 | $6.44 \times 10^{-13}$ | $3.79 \times 10^{-13}$ | $3.27 \times 10^{-13}$ |
| 11.02 | 30 | $4.91 \times 10^{-15}$ | $2.39 \times 10^{-15}$ | $2.19 \times 10^{-15}$ |
| | 90 | $6.48 \times 10^{-13}$ | $3.87 \times 10^{-13}$ | $3.38 \times 10^{-13}$ |
| 12.70 | 30 | $5.15 \times 10^{-15}$ | $2.57 \times 10^{-15}$ | $2.37 \times 10^{-15}$ |
| | 90 | $7.03 \times 10^{-13}$ | $4.07 \times 10^{-13}$ | $3.45 \times 10^{-13}$ |
| 14.65 | 30 | $5.31 \times 10^{-15}$ | $2.55 \times 10^{-15}$ | $2.32 \times 10^{-15}$ |
| | 90 | $6.81 \times 10^{-13}$ | $4.09 \times 10^{-13}$ | $3.48 \times 10^{-13}$ |
| 16.88 | 30 | $5.22 \times 10^{-15}$ | $2.46 \times 10^{-15}$ | $2.32 \times 10^{-15}$ |
| | 90 | $6.90 \times 10^{-13}$ | $4.07 \times 10^{-13}$ | $3.25 \times 10^{-13}$ |
| 19.46 | 30 | $6.02 \times 10^{-15}$ | $3.01 \times 10^{-15}$ | $2.72 \times 10^{-15}$ |
| | 90 | $7.97 \times 10^{-13}$ | $4.98 \times 10^{-13}$ | $3.91 \times 10^{-13}$ |
| 22.44 | 30 | $6.66 \times 10^{-15}$ | $3.16 \times 10^{-15}$ | $2.98 \times 10^{-15}$ |
| | 90 | $8.43 \times 10^{-13}$ | $5.23 \times 10^{-13}$ | $4.35 \times 10^{-13}$ |
| 25.87 | 30 | $8.15 \times 10^{-15}$ | $3.83 \times 10^{-15}$ | $3.64 \times 10^{-15}$ |
| | 90 | $1.04 \times 10^{-12}$ | $6.24 \times 10^{-13}$ | $5.34 \times 10^{-13}$ |
| 29.82 | 30 | $1.19 \times 10^{-14}$ | $5.86 \times 10^{-15}$ | $5.32 \times 10^{-15}$ |
| | 90 | $1.60 \times 10^{-12}$ | $9.60 \times 10^{-13}$ | $8.11 \times 10^{-13}$ |
| 34.38 | 30 | $1.95 \times 10^{-14}$ | $1.01 \times 10^{-14}$ | $8.99 \times 10^{-15}$ |
| | 90 | $2.67 \times 10^{-12}$ | $1.62 \times 10^{-12}$ | $1.45 \times 10^{-12}$ |
| 39.63 | 30 | $3.17 \times 10^{-14}$ | $1.44 \times 10^{-14}$ | $1.48 \times 10^{-14}$ |
| | 90 | $4.25 \times 10^{-12}$ | $2.49 \times 10^{-12}$ | $2.12 \times 10^{-12}$ |
| 45.69 | 30 | $6.39 \times 10^{-14}$ | $3.02 \times 10^{-14}$ | $3.00 \times 10^{-14}$ |
| | 90 | $8.79 \times 10^{-12}$ | $5.28 \times 10^{-12}$ | $4.43 \times 10^{-12}$ |
| 52.67 | 30 | $1.49 \times 10^{-13}$ | $6.60 \times 10^{-14}$ | $6.50 \times 10^{-14}$ |
| | 90 | $1.87 \times 10^{-11}$ | $1.14 \times 10^{-11}$ | $9.88 \times 10^{-12}$ |
| 60.72 | 30 | $2.89 \times 10^{-13}$ | $1.42 \times 10^{-13}$ | $1.38 \times 10^{-13}$ |
| | / | / | / | / |
| 70.00 | 30 | $5.70 \times 10^{-13}$ | $2.92 \times 10^{-13}$ | $2.71 \times 10^{-13}$ |
| | / | / | / | / |

Figure 2:
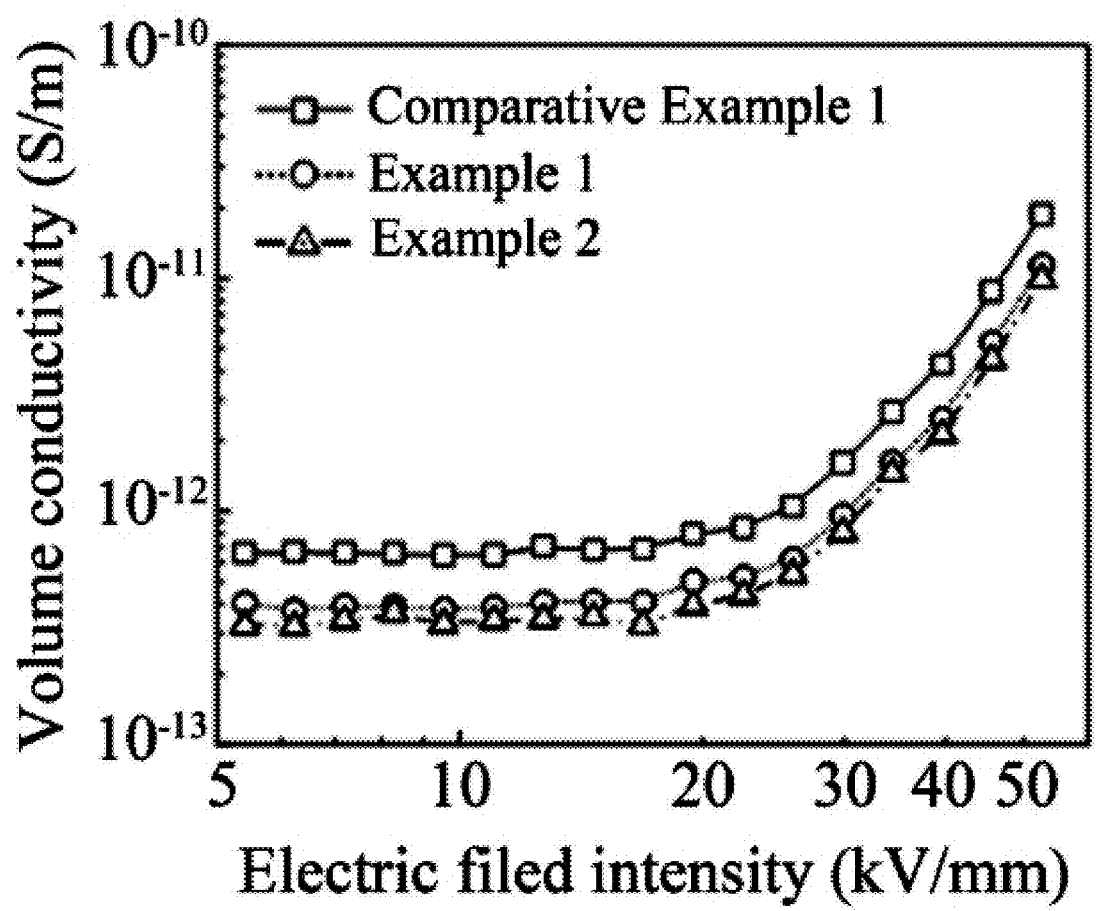
FIG. 2 shows a point-line diagram of volume conductivity of the insulating materials prepared in Example 1, Example 2, and Comparative Example 1 as a function of electric field intensity at 90° C.

According to data in Table 1, point-line diagrams of volume conductivity of the insulating materials prepared in Example 1, Example 2, and Comparative Example 1 as a function of electric field intensity at 30° C. and 90° C. were plotted, as shown in FIG. 1 to FIG. 2. FIG. 1 shows a point-line diagram of volume conductivity of the insulating materials as a function of electric field intensity at 30° C.; and FIG. 2 shows a point-line diagram of volume conductivity of the insulating materials as a function of electric field intensity at 90° C.

As shown in Table 1 and FIGS. 1 to 2, volume conductivity of the insulating materials prepared in Examples 1 and 2 at 30° C. and 90° C. is lower than that of the insulating material prepared in Comparative Example 1. Compared with Comparative Example 1, under a temperature of 90° C. and an electric field intensity of 52.67 kV/mm, the direct current conductivity of the composite insulation materials in Examples 1 and 2 could be reduced by 39.2% and 47.2%, respectively. The results show that the cable insulation material of the core-shell nano-quantum dot/polyethylene composite according to the present disclosure has more excellent performance in terms of direct current conductivity.

The space charge characteristics of the insulating materials prepared in Example 1, Example 2, and Comparative Example 1 at a direct current electric field intensity of 50 kV/mm and a temperature of 25° C. were tested using a pulsed electro-acoustic (PEA) method.

Figure 3:
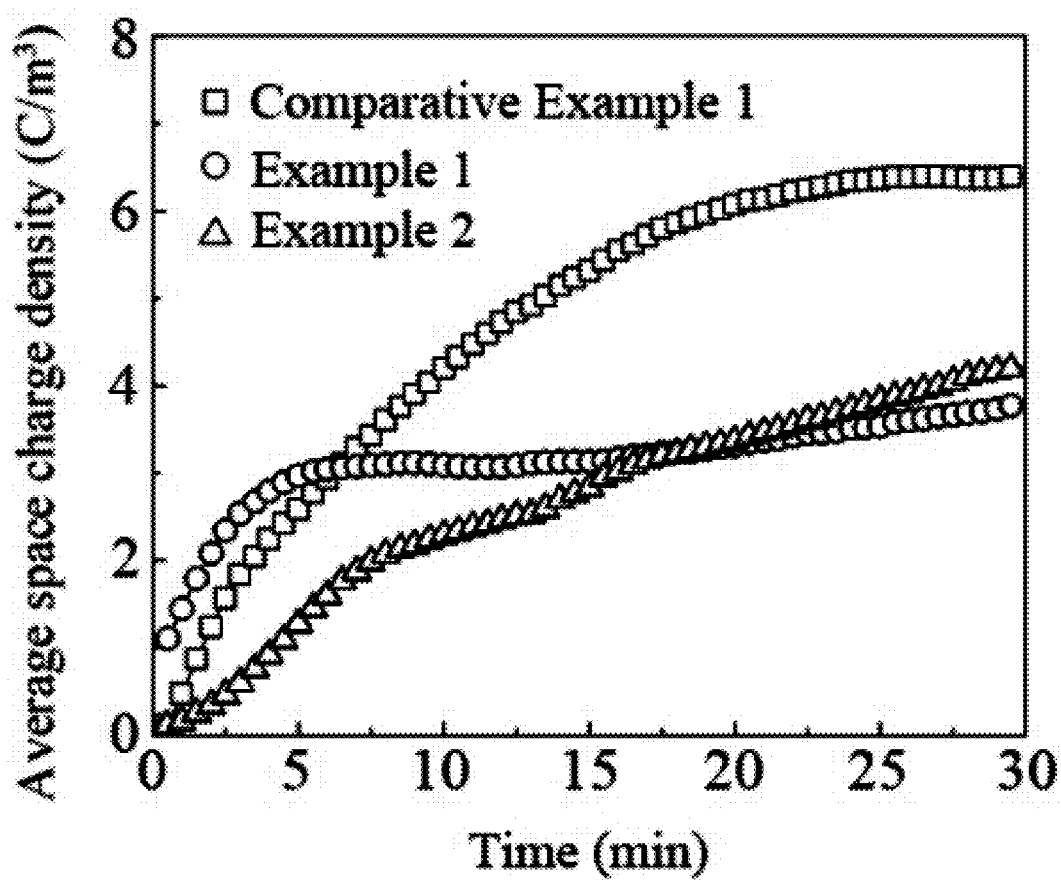
FIG. 3 shows a comparison curve of average space charge density of the insulating materials prepared in Example 1, Example 2, and Comparative Example 1 under a direct current electric field intensity of 50 kV/mm and a temperature of 25° C.

The test results are shown in FIG. 3, and some of which are listed in Table 2.

TABLE 2

Average space charge density of insulating materials prepared in Example 1, Example 2, and Comparative Example 1

| Time/min | Average space charge density/C·m$^{-3}$ | | |
|---|---|---|---|
| | Comparative Example 1 | Example 1 | Example 2 |
| 5 | 2.58 | 2.97 | 1.27 |
| 10 | 4.20 | 3.09 | 2.28 |
| 15 | 5.32 | 3.13 | 2.83 |
| 20 | 6.07 | 3.32 | 3.36 |
| 25 | 6.37 | 3.54 | 3.83 |
| 30 | 6.40 | 3.81 | 4.22 |

As shown in Table 2 and FIG. 3, the space charge accumulation of the insulating materials prepared in Examples 1 and 2 is lower than that of Comparative Example 1, and the average space charge density of the two examples after running for 30 min at a temperature of 25° C. and a field intensity of 50 kV/mm is reduced by 40.4% and 34.1% compared with Comparative Example 1, respectively. The results indicate that the core-shell nano-quantum dot/polyethylene composite cable insulation material according to the present disclosure has more excellent performance in space charge suppression.

Although the above embodiments have described the present disclosure in detail, they are only a part of, not all of, the embodiments of the present disclosure. Other embodiments may also be obtained by persons based on the present embodiments without inventive labor, and all of these embodiments shall fall within the scope of the present disclosure.

What is claimed is:

1. An insulating material, consisting of the following components in parts by mass:
    100 parts of polyethylene;
    0.01 parts to 1 part of a core-shell quantum dot;
    0.5 parts to 2 parts of a peroxide cross-linking agent; and
    0.5 parts to 2 parts of an antioxidant;
    wherein the core-shell quantum dot comprises a core layer, a shell layer covering a surface of the core layer, and an oil-soluble modified ligand on a surface of the shell layer; the core layer is selected from the group consisting of cadmium selenide and zinc selenide; and the shell layer is zinc sulfide; and
    the insulating material is prepared by a method comprising the following steps:
    dissolving the polyethylene in a first organic solvent to obtain a polyethylene solution;
    dispersing the core-shell quantum dot in a second organic solvent to obtain a core-shell quantum dot dispersion;
    mixing the polyethylene solution with the core-shell quantum dot dispersion, and subjecting a resulting mixture to distillation to obtain a core-shell quantum dot/polyethylene composite material; and
    mixing the core-shell quantum dot/polyethylene composite material, the peroxide cross-linking agent, and the antioxidant, and subjecting an obtained mixture to leveling absorption to obtain the insulating material.

2. The insulating material according to claim 1, wherein the core-shell quantum dot has an average particle size of 2 nm to 20 nm.

3. The insulating material according to claim 2, wherein the oil-soluble modified ligand is octadecylamine.

4. The insulating material according to claim 1, wherein the peroxide cross-linking agent comprises one selected from the group consisting of dicumyl peroxide and bis(tert-butyldioxyisopropyl)benzene; and the antioxidant comprises one selected from the group consisting of octadecyl 3-(3,5-di-tert-butyl-4-hydroxyphenyl)propionate, pentaerythritol tetrakis(3-(3,5-di-tert-butyl-4-hydroxyphenyl)propionate), and 4,4'-thiobis(6-tert-butyl-m-cresol).

5. The insulating material according to claim 1, wherein the polyethylene is low-density polyethylene.

6. A method for preparing the insulating material according to claim 1, comprising the following steps:

dissolving the polyethylene in the first organic solvent to obtain the polyethylene solution;

dispersing the core-shell quantum dot in the second organic solvent to obtain the core-shell quantum dot dispersion;

mixing the polyethylene solution with the core-shell quantum dot dispersion, and subjecting the resulting mixture to distillation to obtain the core-shell quantum dot/polyethylene composite material; and mixing the core-shell quantum dot/polyethylene composite material, the peroxide cross-linking agent, and the antioxidant, and subjecting the obtained mixture to the leveling absorption to obtain the insulating material.

7. The method according to claim 6, wherein the distillation is vacuum distillation; and
the vacuum distillation is conducted at a vacuum degree of 0.08 atm to 0.12 atm and a temperature of 65° C. to 75° C.

8. The method according to claim 6, wherein the method further comprises: after the distillation, subjecting a solid obtained after the distillation to ethanol washing and vacuum drying in sequence.

9. The method according to claim 6, wherein the leveling absorption is conducted at a temperature of 68° C. to 72° C. for 22 h to 26 h.

10. The method according to claim 6, wherein the core-shell quantum dot has an average particle size of 2 nm to 20 nm.

11. The method according to claim 10, wherein the oil-soluble modified ligand is octadecylamine.

12. The method according to claim 6, wherein the peroxide cross-linking agent comprises one selected from the group consisting of dicumyl peroxide and bis(tert-butyldioxyisopropyl)benzene; and the antioxidant comprises one selected from the group consisting of octadecyl 3-(3,5-di-tert-butyl-4-hydroxyphenyl)propionate, pentaerythritol tetrakis(3-(3,5-di-tert-butyl-4-hydroxyphenyl)propionate), and 4,4'-thiobis (6-tert-butyl-m-cresol).

13. The method according to claim 6, wherein the polyethylene is low-density polyethylene.

14. The method according to claim 7, wherein the method further comprises: after the distillation, subjecting a solid obtained after the distillation to ethanol washing and vacuum drying in sequence.

\* \* \* \* \*